(12) United States Patent
Boyer et al.

(10) Patent No.: US 10,437,268 B2
(45) Date of Patent: Oct. 8, 2019

(54) HYBRID FLOW AND PRESSURE REGULATION

(71) Applicant: The ESAB Group Inc., Florence, SC (US)

(72) Inventors: Robert Boyer, Flower Mound, TX (US); John Henderson, Corinth, TX (US)

(73) Assignee: The ESAB Group Inc., Florence, SC (US)

( * ) Notice: Subject to any disclaimer, the term of this patent is extended or adjusted under 35 U.S.C. 154(b) by 77 days.

(21) Appl. No.: 15/690,613

(22) Filed: Aug. 30, 2017

(65) Prior Publication Data

US 2019/0064856 A1 Feb. 28, 2019

(51) Int. Cl.
*G05D 16/10* (2006.01)
*F16K 31/122* (2006.01)
(Continued)

(52) U.S. Cl.
CPC ....... *G05D 16/106* (2013.01); *F16K 31/1221* (2013.01); *F16K 37/0016* (2013.01); *G01D 7/08* (2013.01); *G01L 7/024* (2013.01); *G01L 19/16* (2013.01); *G05D 7/0133* (2013.01); *G01F 1/05* (2013.01); *G01L 7/084* (2013.01); *G01L 7/166* (2013.01); *Y10T 137/7825* (2015.04); *Y10T 137/7847* (2015.04); *Y10T 137/8326* (2015.04)

(58) Field of Classification Search
CPC ......... Y10T 137/7826; Y10T 137/7822; Y10T 137/7847; Y10T 137/8175; Y10T 137/8326; Y10T 137/7929
USPC .................................................... 138/37–16
See application file for complete search history.

(56) References Cited

U.S. PATENT DOCUMENTS 1,856,505 A * 5/1932 Persson ...................... F16K 1/36
137/505.12
3,060,745 A 10/1962 Riley
(Continued)

FOREIGN PATENT DOCUMENTS

| CN | 105927524 A | 9/2016 |
| CN | 106557751 A | 4/2017 |
| CN | 206291996 U | 6/2017 |

OTHER PUBLICATIONS https://www.youtube.com/watch?v=Jw7kLBrYziQ, Published Dec. 11, 2013.*

(Continued)

*Primary Examiner* — Robert K Arundale
(74) *Attorney, Agent, or Firm* — Edell, Shapiro & Finnan, LLC

(57) ABSTRACT

A hybrid pressure and flowguage regulator apparatus includes a regulator body, an inlet, and an outlet assembly. The outlet assembly includes a first orifice of a first size, a second orifice of a second size that is larger than the first size, and a mechanism that automatically moves the first orifice between a first position and a second position. When the first orifice is in the first position, the flow of gas passes through both the first orifice and second orifice. When the first orifice is in the second position, the flow of gas bypasses the first orifice and flows through the second orifice with a specific flow rate or a second pressure that is less than the first pressure. The apparatus may also include a gauge that provides a visual indication of both the specific flow rate and the second pressure.

19 Claims, 9 Drawing Sheets

(51) Int. Cl.
  *F16K 37/00* (2006.01)
  *G05D 7/01* (2006.01)
  *G01L 7/02* (2006.01)
  *G01L 19/16* (2006.01)
  *G01D 7/08* (2006.01)
  *G01L 7/16* (2006.01)
  *G01L 7/08* (2006.01)
  *G01F 1/05* (2006.01)

(56) References Cited

U.S. PATENT DOCUMENTS

| | | | | |
|---|---|---|---|---|
| 3,547,143 A * | 12/1970 | Mills, Jr. | ............ | G05D 16/0663 |
| | | | | 137/315.05 |
| 3,586,045 A * | 6/1971 | Zimmer | ................ | A61M 16/10 |
| | | | | 137/505.18 |
| D225,268 S | 11/1972 | Waite | | |
| D242,235 S | 11/1976 | Redmann | | |
| 4,080,988 A * | 3/1978 | Robertson | ............. | F16K 15/026 |
| | | | | 137/513.3 |
| 4,174,733 A * | 11/1979 | Eidsmore | ................ | G01F 15/00 |
| | | | | 137/269 |
| 4,428,396 A * | 1/1984 | Wall | ........................ | F16K 17/18 |
| | | | | 137/493 |
| 4,773,270 A | 9/1988 | Ogasawara et al. | | |
| D302,394 S | 7/1989 | Merrell | | |
| 4,891,987 A | 1/1990 | Stockton et al. | | |
| 5,085,246 A | 2/1992 | Griinke | | |
| 5,323,773 A * | 6/1994 | Kobayashi | ............... | A62B 9/02 |
| | | | | 128/205.24 |
| 5,373,873 A * | 12/1994 | Miller | ........................ | F17C 5/06 |
| | | | | 137/883 |
| 5,398,721 A * | 3/1995 | Pryor | ........................ | G01F 1/22 |
| | | | | 137/505.25 |
| D361,043 S | 8/1995 | Grilk | | |
| 5,529,096 A * | 6/1996 | Rowe, Jr. | ................. | A62B 9/02 |
| | | | | 128/202.13 |
| 6,158,457 A * | 12/2000 | Byrd | ........................ | F16K 1/305 |
| | | | | 137/505.25 |
| 6,484,750 B1 * | 11/2002 | Foos | ......................... | G01F 1/22 |
| | | | | 137/505.25 |
| 6,647,982 B1 * | 11/2003 | Zaiser | ................... | A61M 16/10 |
| | | | | 128/204.18 |
| 6,834,672 B2 * | 12/2004 | Chen | ......................... | B25F 5/00 |
| | | | | 137/505.42 |
| 7,089,956 B1 * | 8/2006 | Davidson | ................ | F16K 1/305 |
| | | | | 137/377 |
| 7,140,386 B2 | 11/2006 | Avis et al. | | |
| D537,744 S | 3/2007 | Wu | | |
| 7,762,276 B2 * | 7/2010 | Miller, Jr. | ............. | F16K 15/026 |
| | | | | 137/513.3 |
| D706,661 S | 6/2014 | Boyer | | |
| 2004/0099317 A1 * | 5/2004 | Douglas | .................. | F17C 13/04 |
| | | | | 137/613 |
| 2006/0060251 A1 | 3/2006 | Gamard et al. | | |
| 2008/0083463 A1 * | 4/2008 | Fazekas | .............. | F24D 19/1018 |
| | | | | 137/512.1 |
| 2010/0229959 A1 * | 9/2010 | Boyer | ..................... | F17C 13/04 |
| | | | | 137/116.3 |
| 2016/0131121 A1 * | 5/2016 | Steingass | ............ | F04B 11/0091 |

OTHER PUBLICATIONS

FPA400 Manual, Printed Dec. 2018.*
Esab Victor, ESS3-Edge Series Flow Gauge, Gas Equipment, Produts & Solutions, available at http://www.esabna.com/us/en/products/index.cfm?fuseaction=home.product&productCode=V445180, last accessed on Sep. 12, 2017, 3 pages.
Victor, Edge Series 2.0 Regulators High Capacity, Single Stage Regulator Fact Sheet, May, 4, 2017, 2 pages.
Western Enterprises, "VN Series Game Changer Presentation," available at http://westernenterprises.com/wp-content/uploads/2013/09VN-Game-Changer-Presentation.pdf, downloaded on May 11, 2017, 18 pages.
Communication from European Patent Office for EP Patent Application No. 18184406.9-1204, Partial European Search Report, dated Jan. 28, 2019, 16 pages.
Chinese Office Action in corresponding Chinese Application No. 201810950806.5, dated Jul. 24, 2019, 18 pages with English translation.

* cited by examiner

HYBRID FLOW AND PRESSURE REGULATION

TECHNICAL FIELD

The present disclosure is directed toward gas regulation and, in particular, toward regulation of gas based on pressure and/or flow with a single apparatus.

BACKGROUND

Currently, there are two common types of gas pressure regulators: pressure regulators and flowgauge regulators. Pressure regulators control the pressure of a gas passing therethrough and regulate an inlet pressure to a specific outlet pressure. Often, pressure regulators include two gauges, an inlet pressure gauge and an outlet (or "delivery") pressure gauge. These gauges have scales and increments, and may indicate pressure in pounds per square inch (PSI), bar, kilopascal (kPa), or other pressure units. By comparison, flowgauge regulators output a specific flow rate. That is, a flowguage outputs a specific flow rate when a specific pressure is generated inside the regulator. The gauge on the flowgauge regulator provides an indication of the flow rate (e.g., in cubic feet per hour (CFH)). Typically, in operation, an operator must utilize separate regulators to control and/or measure pressure and then control and/or measure a flow rate.

SUMMARY

The present disclosure is directed towards hybrid pressure and flow regulation. According to one embodiment, hybrid pressure and flow regulation is effectuated with an apparatus that includes a regulator body, an inlet configured to introduce a flow of gas into the regulator body under a first pressure, and an outlet assembly that directs the flow of gas from the regulator body into a downstream gas line. The outlet assembly includes a first orifice of a first size, a second orifice of a second size that is larger than the first size, and a mechanism that automatically moves the first orifice between two distinct positions: a first position and a second position. When the first orifice is in the first position, the flow of gas passes through both the first orifice and second orifice to the downstream gas line. When the first orifice is in the second position, the flow of gas bypasses the first orifice and flows through the second orifice to the downstream gas line with a specific flow rate or a second pressure that is less than the first pressure. The advantages of this apparatus are described in detail below; however, briefly, the apparatus provides a versatile and single device solution for pressure and flow rate regulation.

In at least some embodiments, the regulator body of the apparatus also includes a gauge that provides a visual indication of both the specific flow rate and the second pressure. Advantageously, the visual indicia may allow a user to precisely regulate gas to a specific pressure or flow rate. The gauge may include radial indicia with a first portion and a second portion. The first portion provides an indication of the specific flow rate and the second portion provides an indication of the second pressure. Moreover, the first portion may define flow ranges suitable for at least one of brazing and purging. The various portions and/or defined flow ranges may be advantageous because they may offer clear visual indications that gas is suitable for frequently executed pressure or flow specific operations.

Additionally or alternatively, the mechanism of the apparatus may include a movable poppet that positions the first orifice in the first position to place the first orifice into fluid communication with the flow of gas and positions the first orifice in the second position to allow the flow of gas to bypass the first orifice. This is an inexpensive, effective, and stable mechanism for moving the first orifice. In some of these embodiments, the mechanism also includes a biasing member that retains the first orifice in the first position until backpressure in the outlet assembly reaches a predetermined threshold. Advantageously, the biasing member ensures that the first orifice automatically returns to a position that is suitable for providing low flow rates, as is described in further detail below. As is also described in further detail below, in at least some embodiments with a biasing member, the backpressure automatically moves the first orifice to its second position when the backpressure reaches the predetermined threshold. Consequently, and advantageously, a user need not interact with the orifices to achieve different flow rates.

In still further embodiments, the regulator body of the apparatus regulates the first pressure of the flow of gas to the second pressure and includes an adjustment assembly configured to control a magnitude of the second pressure. In some of these embodiments, the regulator body defines an internal chamber and the adjustment assembly controls the magnitude of the second pressure by adjusting a size of the internal chamber.

According to one embodiment, hybrid pressure and flow regulation is effectuated with an outlet assembly that includes a housing defining an internal cavity, a first orifice, a second orifice, and an internal mechanism. The first orifice is of a first size and is in fluid communication with a flow of gas flowing through the internal cavity when in a first position. The second orifice is of a second size that is larger than the first size. The internal mechanism automatically moves the first orifice between two distinct positions: a first position and a second position. When the first orifice is in the first position, the flow of gas through the outlet assembly passes through both the first orifice and second orifice so that the flow of gas exits the outlet assembly with a first flow rate. When the first orifice is in the second position, the flow of gas bypasses the first orifice and flows through the second orifice so that the flow of gas exits the outlet assembly with a second flow rate.

In at least some embodiments, the internal mechanism of the outlet assembly includes a movable poppet that moves the first orifice between the first position and the second position. In some of these embodiments, a biasing member is biased against the movable poppet to cause the movable poppet to retain the first orifice in the first position until backpressure in the outlet assembly reaches a predetermined threshold. The backpressure may automatically move the poppet so that the poppet moves the first orifice into the second position when the backpressure reaches the predetermined threshold. Moreover, in some embodiments, the outlet assembly also includes an annular passageway that is opened when the poppet moves the first orifice into the second position to allow the flow of gas to bypass the first orifice. As mentioned, a movable poppet and/or automatic movement may provide a number of advantages, such as efficient and easy gas regulation.

In further embodiments, outlet assembly is removably securable to a regulator body of the hybrid pressure and flowgauge regulator. Advantageously, the outlet assembly can be retrofitted to regulator devices to convert the regulator into a hybrid regulator or switched between regulator bodies as regulator bodies are serviced, upgraded, etc. This may also allow the outlet assembly to be used with different styles, shapes, or configurations of regulator bodies (i.e., regulator bodies sized for specific applications).

According to yet another embodiment, hybrid pressure and flow regulation is effectuated with a single gauge including first indicia and second indicia. The first indicia provides an indication of a flow rate of gas exiting an outlet of a hybrid pressure and flowgauge regulator when the gas exits with a pressure below a gauge threshold pressure. The second indicia provides an indication of a pressure of the gas exiting the outlet of the hybrid pressure and flowgauge regulator when the gas exits with a pressure above the gauge threshold pressure. Consequently, a user can easily and accurately monitor gas regulation to safely and accurately achieve a variety of pressures or flow rates.

In some embodiments, the first indicia and the second indicia of the single gauge are visual indicia. Additionally or alternatively, the first indicia may define flow ranges for at least one of brazing and purging. Still further, in some embodiments of the single gauge, the first indicia and the second indicia are included in distinct portions of a radial band. In yet other embodiments, the second indicia includes radial indicia configured to indicate the pressure of the gas exiting the outlet. As mentioned, among other advantages the various indicia, portions and flow ranges may be advantageous because they may offer clear visual indications that gas is suitable for frequently executed pressure or flow specific operations.

BRIEF DESCRIPTION OF THE SEVERAL VIEWS OF THE DRAWINGS

Like numerals identify like components throughout the figures.

DETAILED DESCRIPTION

Figure 1:
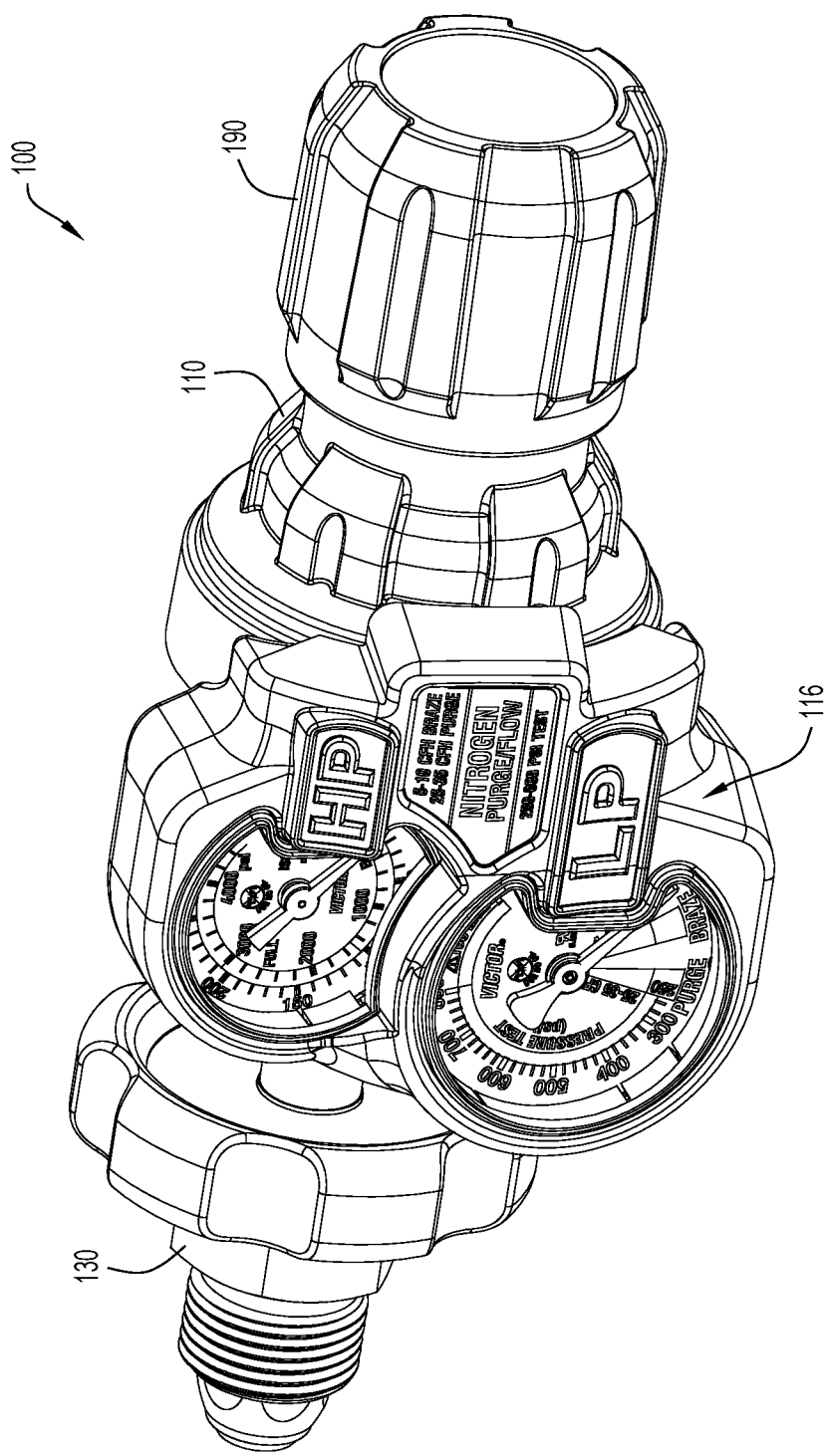
FIG. 1 is a front perspective view of a hybrid pressure and flowgauge regulator, according to an example embodiment of the present disclosure.

A hybrid pressure and flowgauge regulator is described and presented herein. The regulator is a hybrid regulator because the regulator can be used to measure and/or control the flow rate and/or pressure of gas passing therethrough and does not need to be swapped or supplemented with another regulator in order to provide this dual functionality. That is, the regulator described and presented herein is a single device that can regulate pressure and flow rate. To accomplish this, the regulator presented herein includes a unique outlet assembly that automatically aligns different orifices with gas exiting the regulator. More specifically, and as is explained in further detail herein, the regulator includes an outlet assembly with two orifices and the orifices are selectively, and automatically, aligned with gas flowing through the outlet assembly (i.e., gas exiting the regulator) in order to provide different flow rates for certain ranges of low pressures and to provide precise control of the pressure of gas exiting the regulator, for example, to allow for precise pressure testing. The regulator also includes a unique gauge that provides indications of flow and pressure so that a user can easily monitor and adjust multiple variables (i.e., pressure and flow) controlled by the regulator.

By comparison, existing regulators often measure and/or control pressure or flow, but not both. Consequently, if a user needs to measure flow in a first operation and pressure in a second operation, the user may need to carry two regulators and swap out the regulators between operations. As a more specific example, if a plumber needs to braze a connection and subsequently pressure test the system including the brazed connection, the plumber may need to swap a flowgauge regulator out for a pressure regulator between the brazing and the pressure testing steps. This may be burdensome and expensive (insofar as the user needs to purchase two regulators) and is also inefficient.

Alternatively, some regulators may include different orifices that can be manually switched into operation to support different operations; however, these regulators typically operate off a fixed pressure which may cause certain flow rates to be delivered with a dangerous amount of pressure. For example, if a system including one of these regulators is "dead-ended." Dead-ending occurs when the nozzle or outlet of a hose, tube or other aperture is blocked. When dead-ended, the high pressure in the regulator may build up and result in a catastrophic failure. The fixed pressure rate of existing regulators also limits the flexibility and/or viability of the regulator for pressure operations that require pressures differing from the predefined pressure (and heating, ventilation, and air conditioning (HVAC) operations frequently require pressures anywhere in the range of 200 pounds per square inch (PSI) to 750 PSI). Consequently, an operator with a multiple-orifice regulator may still be required to carry multiple regulators (i.e., for different pressures) and swap out regulators between operations. Moreover, often, these multi-orifice devices do not provide feedback relating to the pressure and/or flow rate and a user must trust operational settings marked on the device (i.e., "braze" or "purge" markings without any specific flow or pressure indications).

Figure 2:
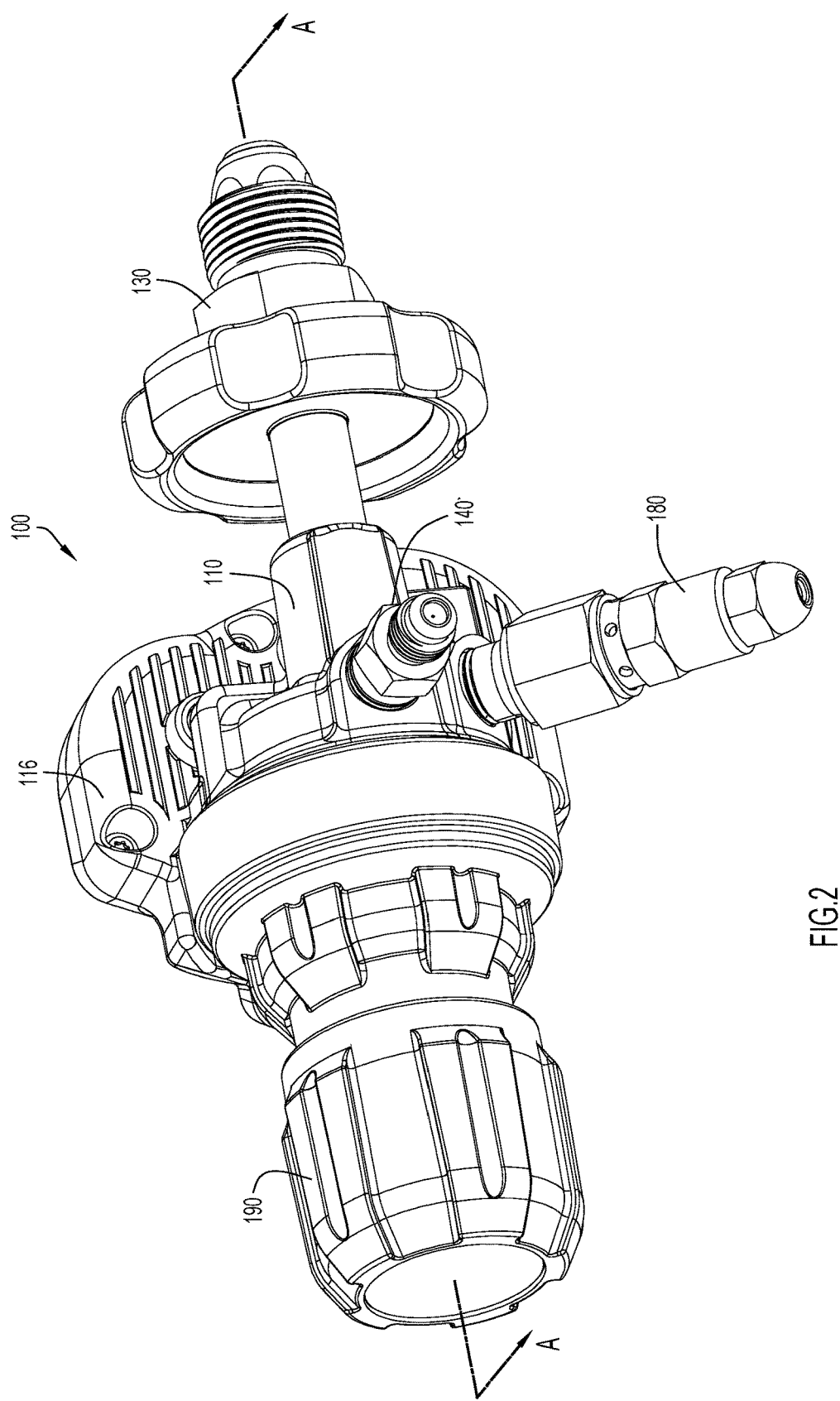
FIG. 2 is a rear perspective view of the hybrid pressure and flowgauge regulator of FIG. 1.
Figure 3:
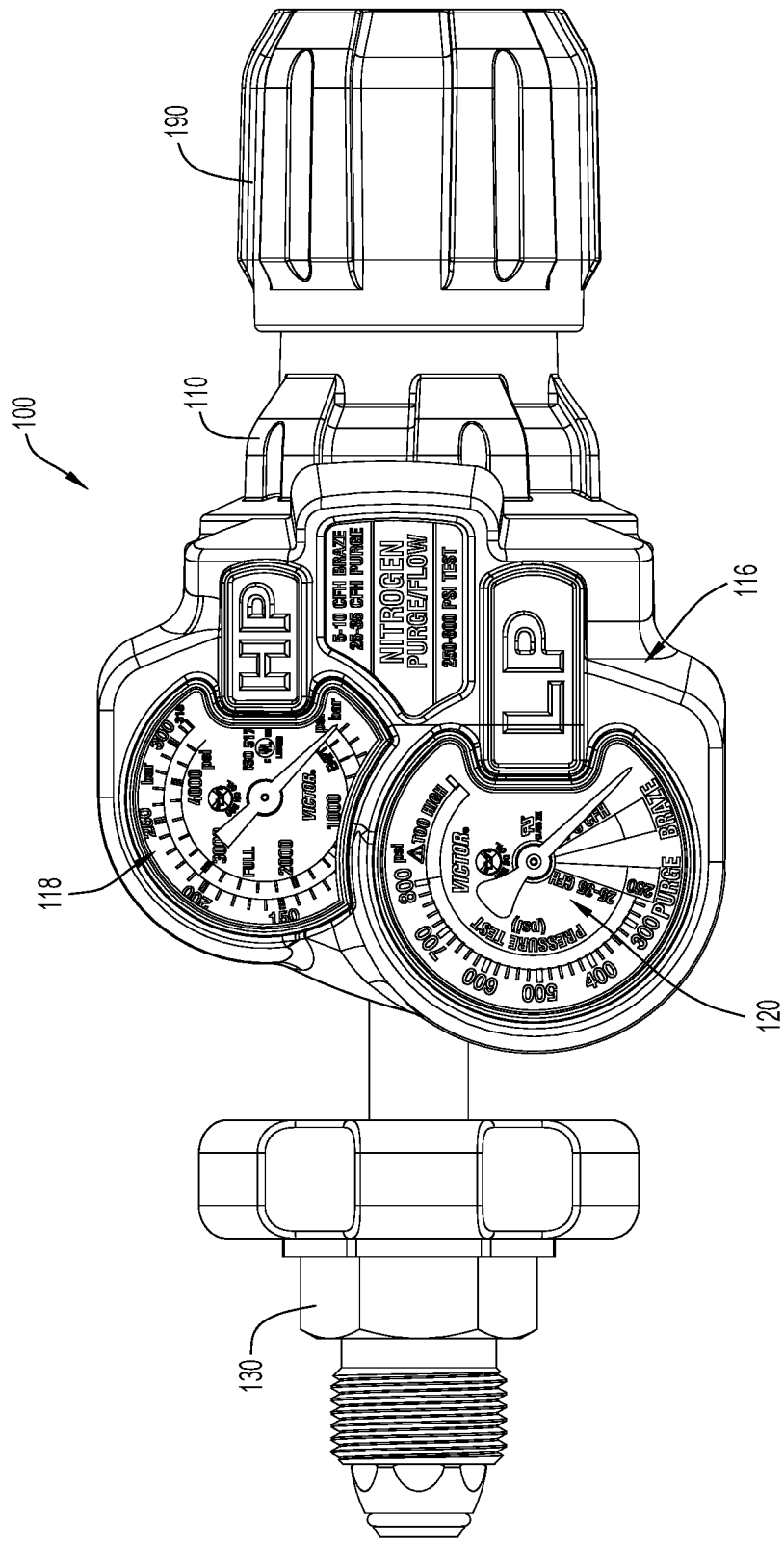
FIG. 3 is a front view of the hybrid pressure and flowgauge regulator of FIG. 1.

FIGS. 1-3 depict a front perspective view, a rear perspective view, and a front view, respectively, of an example embodiment of a hybrid pressure and flowgauge regulator 100. The regulator 100 includes a regulator body 110, an inlet 130, an outlet assembly 140, and an adjustment mechanism 190. In the depicted embodiment, the outlet assembly 140 is 90 degrees offset from the inlet 130 (i.e., a central axis of the inlet 130 is perpendicular to a central axis of the outlet assembly 140); however, this is merely an example and, in other embodiments, the outlet assembly 140 may be oriented in any position with respect to the inlet 130. For example, the outlet assembly 140 and inlet 130 may be aligned on the same central axis or include parallel central axes. Regardless of the orientation or arrangement of the inlet 130 and outlet assembly 140, generally, the regulator body 110 includes one or more pathways that allow high pressure gas received from the inlet 130 to flow to the outlet assembly 140. The regulator body 110 may throttle the high pressure gas as it passes therethrough and the throttling may be controlled by the adjustment mechanism 190. In the depicted embodiment, the regulator also includes a safety valve 180 (see FIG. 2) that is configured to relieve pressure in the regulator body 110 when absolutely necessary (i.e., to prevent catastrophic failure); however, other embodiments need not include a safety valve 180.

The regulator body 110 also includes a gauge housing 116 configured to support one or more gauges. In the particular embodiment shown in FIGS. 1-3, the gauge housing 116 supports two gauges: an inlet gauge 118 and a hybrid outlet gauge 120 (see FIG. 3). The inlet gauge is generally configured to measure the pressure of high pressure gas flowing into the regulator body 110 via the inlet 130. Meanwhile, and as is explained in further detail below, the hybrid outlet gauge 120 measures the flow and/or pressure of gas flowing out of the outlet assembly 140. That is, gauge 120 provides an indication of the pressure and/or flow of gas exiting the regulator 100 via the outlet assembly 140 (i.e., gas flowing into a downstream gas line to which the regulator is connected).

Figure 4:
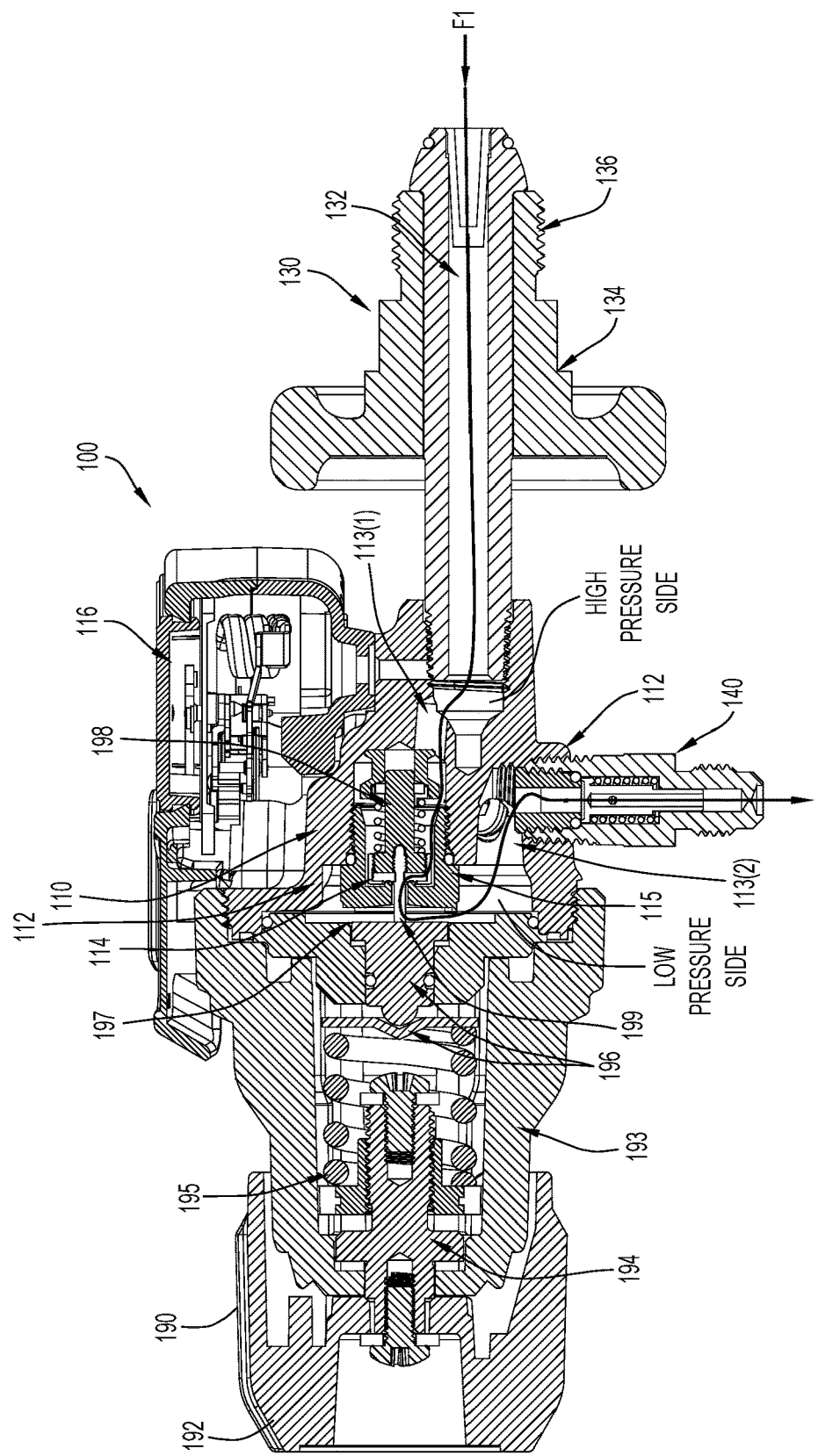
FIG. 4 is a sectional view of the hybrid pressure and flowgauge regulator of FIG. 2 taken along plane A-A.

FIG. 4 provides a sectional view of the hybrid regulator 100 taken along plane A-A from FIG. 2. Plane A-A bisects the inlet 130 and the outlet assembly 140, as well as the regulator body 110 and adjustment mechanism 190, and, thus, illustrates each of these components in detail. For completeness, the depicted inlet 130, regulator body 110, and adjustment mechanism 190 are now each briefly described (by comparison, the outlet assembly 140 is described in detail below in connection with FIGS. 5-8B). However, it is to be understood that the depicted inlet 130, regulator body 110, and adjustment mechanism 190 are merely examples and, in other embodiments, the outlet assembly 140 may be installed onto any regulator body 110, with any inlet 130 or adjustment mechanism 190 in order to provide a hybrid pressure and flowgauge regulator.

That being said, first, the inlet 130 includes a main body 134 that defines an internal channel 132. The channel 132 may have a selectively openable valve at its distal end (i.e., the end distal from the regulator body 110 that can be attached to a cylinder or tank) and may include an opening (with or without a valve) at its proximate end (i.e., the end proximate to the regulator body 110) that allows gas (typically high pressure gas) to flow into the regulator body 110. The inlet 130 may also include threads 136, or any other mating feature, to allow the inlet 130 to be safely secured to an upstream gas line or gas source.

Second, the regulator body 110 includes a main body 112 that defines channels 113(1) and 113(2) that allow gas from the inlet 130 to flow to the outlet assembly 140. Additionally, the regulator body 110 includes or defines a seat 115 that, together with portions of the adjustment mechanism 190 (which are described in further detail below), defines a throttle chamber 114. As is implied by the name, the adjustment mechanism 190 can adjust one or more dimensions, such as the width, of the throttle chamber 114 to throttle the flow of high pressure gas from the inlet 130 before the gas reaches the outlet assembly 140.

Third, and finally, the adjustment mechanism 190 includes a graspable portion 192 that can be rotated or spun by a user in order to actuate the adjustment mechanism 190. The graspable portion 192 is movably mounted on a fixed portion 193 that is fixedly coupled to the regulator body 110. More specifically, the graspable portion 192 can be moved laterally along the fixed portion 193 (as it is rotated) so that actuation (i.e., rotation) of the graspable portion 192 moves the graspable portion 192 towards or away from the regulator body 110. When the graspable portion 192 moves towards the regulator body 110, an actuating assembly 194 included in or coupled to the graspable portion 192 compresses a biasing member 195 which, in turn, exerts a lateral force on a piston and/or diaphragm 196. The piston/diaphragm 196 transfers this lateral force to a stem 199 which acts against a chamber poppet 198 to adjust a dimension (i.e., the width) of the internal chamber 114 of the regulator body 110. More simply, actuating the adjustment mechanism 190 opens or closes pathways through the regulator body 110 in order to control the throttling of gasses flowing there through. In some embodiments, the adjustment mechanism 190 may also include a diaphragm chamber 197, into which a portion of the gas flowing through regulator body 110 (i.e., through channel 113(2)) may flow to balance the forces exerted by or on the adjustment mechanism 190.

Still referring to FIG. 4, since plane A-A bisects the regulator body 110, the inlet 130, and the outlet assembly 140, the sectional view of the hybrid regulator 100 show in FIG. 4 clearly illustrates a flow path F1 through the regulator. The flow path F1 is a high level flow path and it is not intended to illustrate the particular flow path through the outlet assembly 140, which is described in further detail below in connection with FIGS. 7A-B. That being said, the flow path F1 accurately depicts gas entering the regulator 100 (i.e., from a cylinder, tank or other such upstream line or source to which the regulator is connected) via the channel 132 in the inlet 130 and flowing into the first channel 113(1) formed in the regulator body 110. The channel 113(1) guides the gas flow to the chamber 114, the dimensions of which can be controlled by the adjustment mechanism 190 to throttle the gas flow, as is described above. The gas then exits the chamber 114 through a second channel 113(2) that guides the gas flow to the outlet assembly 140. The gas then flows through the outlet assembly 140 in the manner described below in connection with FIGS. 7A and 7B.

Figure 5:
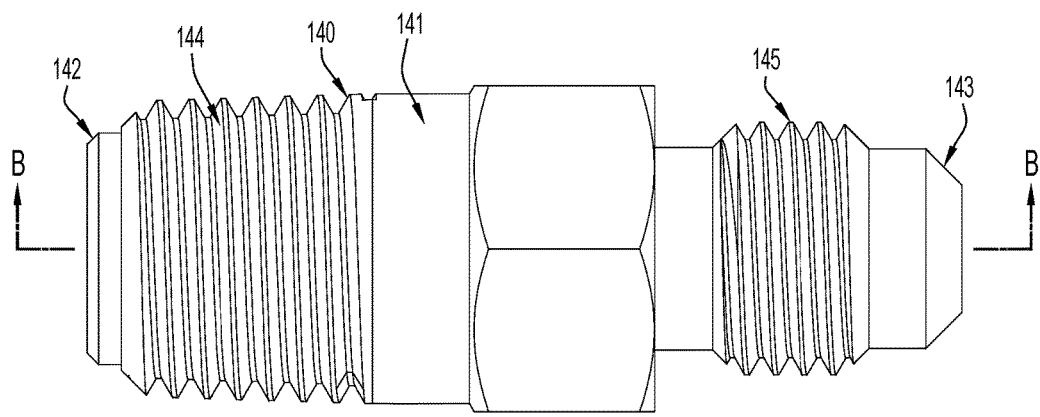
FIG. 5 is a side view of an outlet device included in the hybrid pressure and flowgauge regulator of FIG. 1.

Now turning to FIG. 5, the outlet assembly 140 includes a housing 141 that extends from a first end 142 to a second end 143. The first end 142 is configured to be attached to the regulator body 110 and, thus, the housing 141 includes an external attachment feature 144 disposed proximate the first end 142. Similarly, the second end 143 is configured to be attached to a downstream gas line or component receiving regulated gas and, thus, the housing 141 includes an external attachment feature 145 proximate the second end 143. In the depicted embodiment, attachment features 143 and 145 are threads configured to mate with corresponding threads included on the regulator body and a downstream gas line or component, respectively. However, in other embodiments, the attachment features 143 and 145 may be or include any type of coupler (i.e., a snap engagement, a detent structure, etc.) that can be used to effectuate a sealed attachment on either end of the outlet assembly 140.

Figure 6:
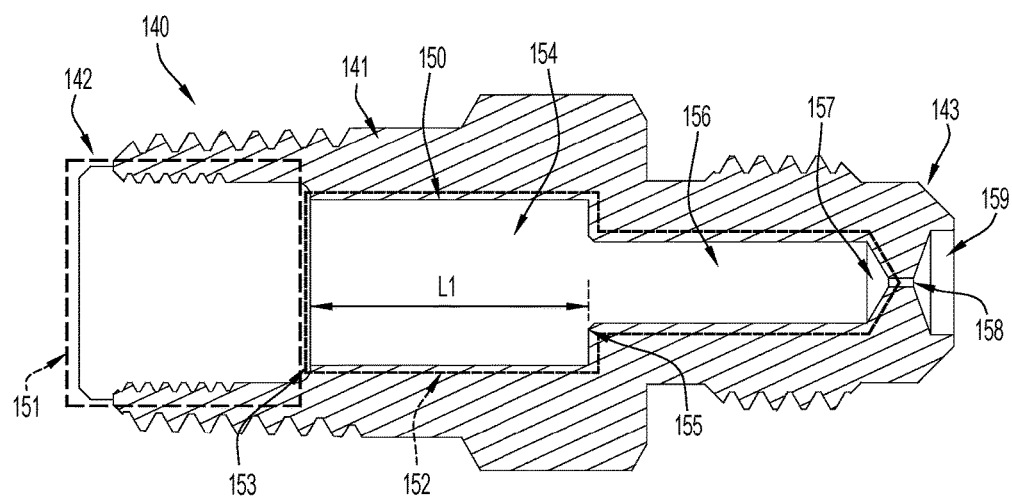
FIG. 6 is a sectional view of the outlet device of FIG. 5 taken along line B-B of FIG. 5, with internal components removed from the outlet device.

FIG. 6 shows a sectional view of the outlet assembly 140 taken along line B-B of FIG. 5; however, for clarity, internal components of the outlet assembly 140 are removed in FIG. 5. Consequently, an internal cavity 150 defined by the housing 141 is clearly depicted in FIG. 6. Additionally, in FIG. 6, dashed lines are used to demarcate portions of the internal cavity 150 that, in actuality, are not separated from each other. In particular, FIG. 6 depicts the internal cavity 150 with a first portion 151, a second portion 152, and a third portion 159. The first portion 151 extends inwards from the first end 142 and terminates at a shoulder 153 that creates a step between the first portion 151 and the second portion 152. On the other end, the third portion 159 extends inwards from the second end 143 to an orifice 158 that connects the third portion 159 to the second portion 152. The orifice 158 is frequently referred to herein as the second stage orifice 158 because, as is described below, orifice 158 may control the flow rate of gas exiting the outlet assembly when an internal mechanism included in the outlet assembly 140 is actuated to a second position.

The second portion 152 of the internal cavity 150 extends between the first portion 151 and the third portion 159. More specifically, the second portion 152 extends from the shoulder 153 of the first portion 151 to the orifice 158. The second portion 152 is a stepped portion and includes a clearly defined step 155 (i.e., a right angle step as opposed to an arced or gently sloping step) so that an annulus 154 of length L1 is defined between the shoulder 153 and the step 155. A generally unimpeded conduit 156, insofar as unimpeded is used to denote that the conduit 156 does not include a step or shoulder, extends between the step 155 and the second end 143 and terminates in a funnel-type end 157 that directs any gas flowing through the conduit 156 into the second stage orifice 158.

Figure 7A:
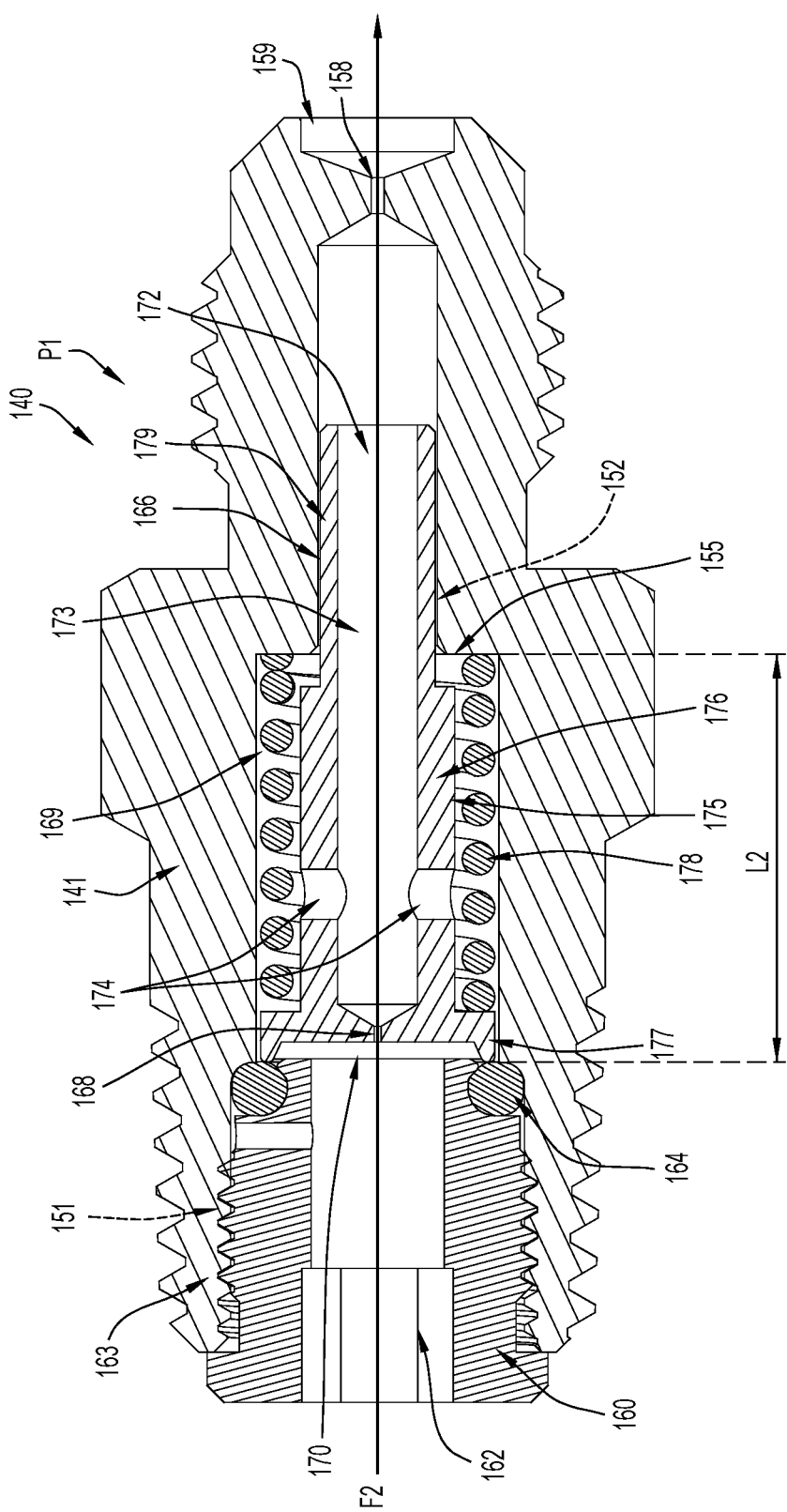
FIG. 7A is a sectional view of the outlet device of FIG. 5 taken along line B-B of FIG. 5, including internal components, such as the internal mechanism, which is in a first position.
Figure 7B:
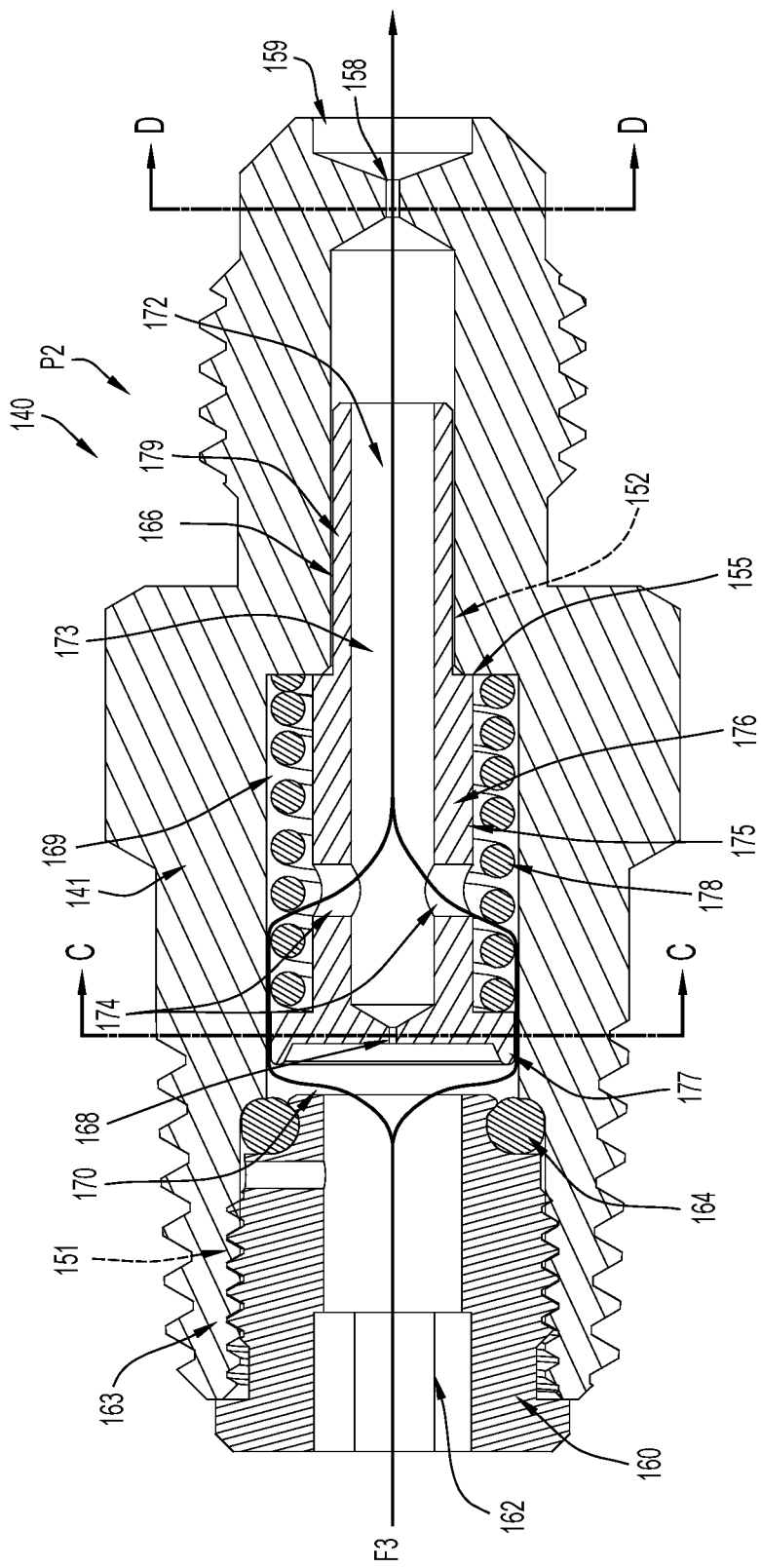
FIG. 7B is a sectional view of the outlet device of FIG. 5 taken along line B-B of FIG. 5, including internal components, such as the internal mechanism, which is in a second position.

Now turning to FIGS. 7A and 7B, when completely assembled, the outlet device 140 includes a plug 160 and an internal mechanism 166, which may also be referred to as a poppet 166, installed within the internal cavity 150. Together with the third portion 159, which is essentially an outlet for the outlet device 140, the plug 160 and the internal mechanism 166 define multiple flow paths through the outlet assembly 140. The different paths allow orifices of different sizes to be aligned with gas flowing through the outlet assembly 140. As is described below, the internal mechanism 166 is primarily responsible for automatically shifting or changing the path of gas flowing through the outlet assembly 140; however, in some instances (i.e., in some positions), the internal mechanism 166 works with the plug 160 to define chambers and/or seal pathways to cause gas to flow along specific pathways through the outlet assembly 140. That is, the internal mechanism 166 is configured to automatically move a first orifice into and out of alignment with gas flowing through the outlet assembly 140 by selectively engaging portions of the plug 160.

More specifically, the plug 160 is fixedly secured within the internal cavity 150 of the outlet device 140 (i.e., by threads 163 that are mated with internal threads (unlabeled) of the housing 141) so that a seal or o-ring 164 included at a distal end of the plug 160 (i.e., an interior end of the plug 160) is compressed against the shoulder 153 of the first portion 151. Additionally, the plug 160 defines an internal pathway 162 through the first portion 151 that terminates at the shoulder 153. As is described in further detail below, the internal mechanism 166 includes structural features that selectively engage the o-ring 164 to selectively create or adjust the volume of a chamber 170 adjacent the terminating end of pathway 162. That is, the internal mechanism 166 selectively cooperates with the plug 160 to create or adjust the volume of a chamber 170 at the upstream edge of the second portion 152. Over time, gas flowing into the chamber 170 creates backpressure against the internal mechanism 166 which eventually actuates the internal mechanism 166, as is also described in further detail below.

Figure 8A:
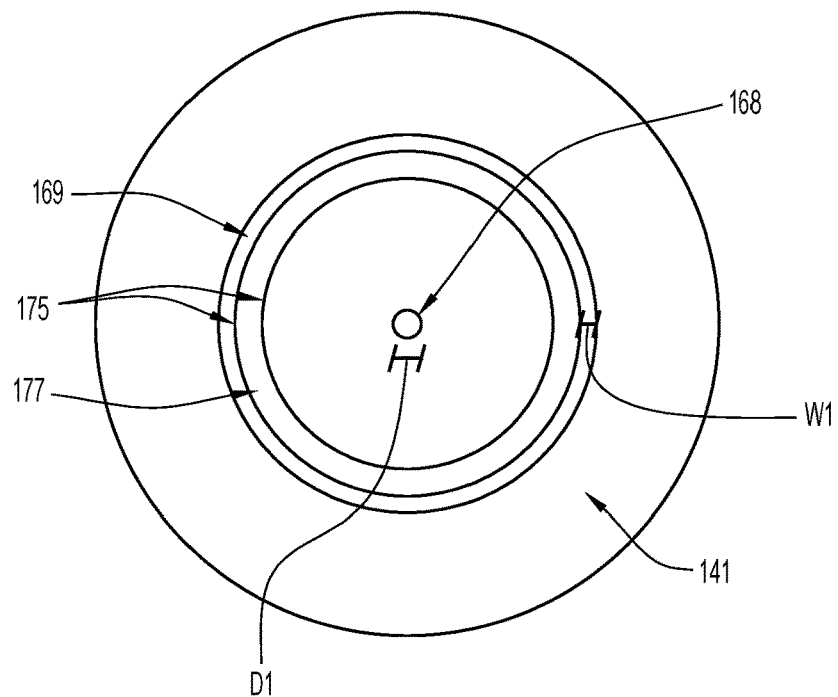
FIG. 8A is a sectional view of the outlet device of FIG. 5 taken along line C-C of FIG. 7B.

Still referring to FIGS. 7A and 7B, but with reference to FIG. 6 as well, the internal mechanism 166 is movably mounted within the second portion 152 of the internal cavity 150, upstream of the second stage orifice 158. The internal mechanism 166 has a main body 175 that includes a base portion 176 and a conduit portion 179. The base portion 176 is fixedly coupled to or formed unitarily with the conduit portion 179 and each are dimensioned to fit within the internal cavity 150 of the outlet assembly 140 (i.e., within the annulus 154 and the conduit 156 of the internal cavity, respectively). In fact, the base portion 176 is sized so that a small gap or annular passageway 169 is formed between the base portion 176 and the annulus 154 (as is also shown in FIG. 8A). The conduit portion 179 may or may not be sized to form a gap between the conduit portion 179 and the conduit 156; however, either way, the base portion 176 can move (i.e., slide) within the annulus 154 of the second portion 152 (of the interior cavity 150) and the conduit portion 179 can move (i.e., slide) within the conduit 156 of the second portion 152 (of the interior cavity 150). However, notably, the base portion 176 is wider (i.e., has a larger diameter) than the conduit 156 of the cavity 150 and, thus, the base portion 176 cannot slide into the conduit 156. Instead, the base portion 176 of the main body 175 of the internal mechanism 166 has a length L2 that is shorter than the length L1 of the annulus 154 (see FIG. 5) so that the base portion 176 can slide within the annulus 154.

Since the conduit portion 179 of the main body 175 is fixedly coupled (or formed unitarily with) the base portion 176 of the main body 175, the two portions move together (i.e., slide together), based on forces exerted against the base portion 176. As mentioned above, this movement is effectuated by backpressure in a chamber 170 formed at the upstream edge of the second portion 152 of the internal cavity 150. In particular, the base portion 176 includes an annular flange 177 that extends outwards radially and laterally (i.e., along the direction in which the length L2 is shown), at an upstream edge of the internal mechanism 166. The flange 177 is configured to mate with the o-ring 164 when the internal mechanism 166 is disposed adjacent the shoulder 153 of the first portion 151 of the internal cavity 150. That is, when the internal mechanism is a first position P1 (see FIG. 7A), the flange 177 mates with the o-ring 164 to seal the edges of the backpressure chamber 170.

Then, as gas flows into the backpressure chamber 170, the gas either passes through the first orifice 168 and/or exerts a force against the internal mechanism 166. However, the internal mechanism 166 also includes a biasing member 178 that counteracts the force created by the backpressure so that the main body 175 of the internal mechanism 166 only moves (i.e., slides) when the backpressure in chamber 170 overcomes a predetermined pressure threshold. In other words, when gas flowing through the outlet device 140 exerts enough force on the internal mechanism 166 to overcome a biasing force of the biasing member 178 the main body 175 automatically slides from a first position P1 (see FIG. 7A) to a second position P2 (see FIG. 7B). When the backpressure in chamber 170 dissipates, the biasing member 178 causes the main body 175 to automatically slide back to the first position P1 (see FIG. 7A). In at least some uses of the depicted embodiment, the main body 175 of the internal mechanism 166 slides approximately horizontally within the internal cavity 150 when moving between position P1 and P2 (i.e., if the outlet device 140 is oriented as shown in FIG. 2); however, in other embodiments, the main body 175 can slide along any axis oriented in any direction (i.e., because the outlet assembly 140 may be oriented in any position with respect to the regulator body 110 and/or the inlet 130).

Figure 8B:
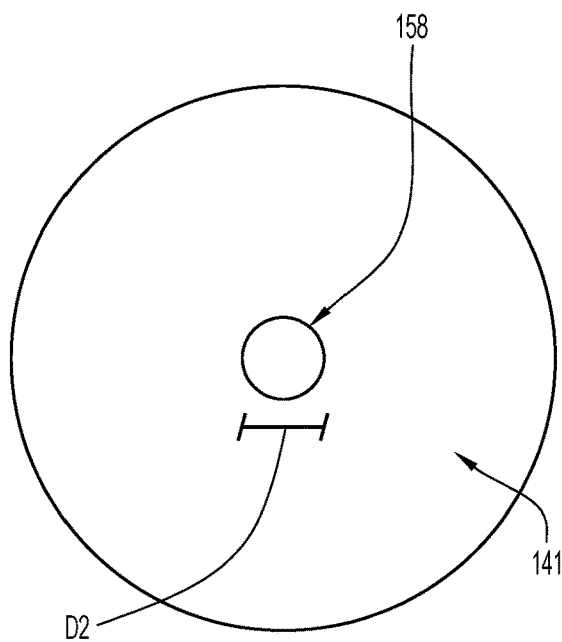
FIG. 8B is a sectional view of the outlet device of FIG. 5 taken along line D-D of FIG. 7B.

Still referring to FIGS. 7A and 7B, but now with reference to FIGS. 8A and 8B as well, when the internal mechanism 166 is in the first position P1, the flange 177 and o-ring 164 form a seal that closes the annular passageway 169 (i.e., the passageway formed around the base portion 176 of the main body 175 and within annulus 154 in which the biasing member 178 is disposed). Consequently, when the internal mechanism 166 is in the first position P1, gas flows through the outlet device 140 along a first flow path F2, through the first orifice 168 and the second orifice 158 (see FIG. 7A). Then, when the internal mechanism 166 is in the second position P2, gas flows through the outlet device 140 along a second path F3 (see FIG. 7B). Paths F2 and F3 are described in further detail below; but, generally, the internal mechanism 166 includes or defines features that cause gas to flow along path F2 and F3 depending on the pressure of the gas in backpressure chamber 170.

For example, the main body 175 of the internal mechanism 166 defines the first stage orifice 168 that connects the backpressure chamber 170 to an internal passageway 172 that extends through the internal mechanism 166. The passageway 172 includes a main pathway 173 and one or more auxiliary pathways 174. The main pathway extends lengthwise (i.e., between the first end 142 and the second end 143 of the outlet assembly) and serves as a conduit between the first stage orifice 168 and the second stage orifice 158 (or at least a conduit between the first stage orifice 168 and the conduit 156, which may connect the main pathway 173 to the second stage orifice 168). Meanwhile, the one or more auxiliary pathways 174 extend perpendicular to the main pathway 173 and connect the annular passageway 169 to the main pathway 173.

Now referring specifically to FIG. 7A, but with continued reference to FIGS. 8A and 8B, when the internal mechanism 166 is in the first position P1, gas flows along path F2, through the plug 160, into the chamber 170. Then, the gas flows, still along path F2, through the first stage orifice 168 included at the upstream edge of the base portion 176, into the main pathway 173 of the internal mechanism 166. Since, as is shown in FIG. 8A, the first stage orifice 168 has a diameter D1 that is relatively small (e.g., 0.008 inches) at least some of the gas flowing into the chamber 170 will not be able to flow through the first stage orifice 168 into the main pathway 166. As mentioned above, gas that flows into the chamber 170 but not into the main pathway 173 (via the first stage orifice 168) will generate backpressure in chamber 170 and eventually actuate the internal mechanism 166, moving the internal mechanism 166 from the first position P1 to the second position P2. However, gas that does flow into the main pathway 173 will flow towards the second end 143 of the outlet assembly and exit the second portion 152 of the internal cavity 150 via the second stage orifice 158 (still along path F2). The gas can then exit the outlet assembly 140 via the outlet 159 (also referred to herein as the third portion 159), as is also shown by path F2.

By comparison, and now referring specifically to FIG. 7B with continued reference to FIGS. 8A and 8B, when the internal mechanism 166 is in the second position P2, gas still flows through the plug 160 and into the chamber 170 (albeit now along path F3), but the chamber 170 is no longer sealed at its exterior edges. That is, the flange 177 is no longer engaged or mated with o-ring 164 and, thus, the annular passageway 169 is accessible from the chamber 170. The annular passageway 169 defines an opening with an overall surface area (see width of the annulus labeled W1 in FIG. 8A) that is substantially larger than the surface area of the first stage orifice 168 and, thus, the gas flow may primarily flow through the annular passageway 169 (i.e., because flowing gas follows the path of least resistance), as is shown by path F3 in FIG. 7B. Consequently, the gas flow will primarily bypass the first stage orifice 168 and the flow rate will not be influenced by the size of the first stage orifice 168. Instead, the gas flows around the first stage orifice 168 through annular passageway 169 and back into the main pathway 173 via the one or more auxiliary pathways 174, as is also shown by path F3. Then the gas will flow towards the second end 143 of the outlet assembly and exit the second portion 152 of the internal cavity 150 via the second stage orifice 158 (still along path F3), which will meter the flow rate of the gas. The gas can then exit the outlet assembly 140 via the outlet 159 (also referred to herein as the third portion 159).

As a brief summary, when the internal mechanism 166 is the second position P2, the second stage orifice 158 (and not the first stage orifice 168) is aligned with gas flowing through the outlet assembly 140 so that the second stage orifice 158 (and not the first stage orifice 168) controls or meters the flow rate of gas flowing through the outlet assembly 140. As mentioned, the internal mechanism 166 automatically moves from the first position P1 to the second position P2 when the pressure in the backpressure chamber 170 reaches a predetermined pressure threshold. Thus, the second stage orifice 158 is automatically placed into fluid communication with the flow of gas, unimpeded by the smaller first stage orifice 168, when gas in the backpressure chamber reaches the predetermined threshold (as the first stage orifice 168 is moved out of fluid communication with the gas flowing through the outlet assembly 140). Notably, since higher gas pressures actuate the internal mechanism 166 (assuming the higher pressure is above the predetermined pressure threshold), gas flowing through the outlet device 140 at higher pressures (i.e., for pressure testing operations) will flow through the second stage orifice 158 (i.e., the larger orifice, instead of the smaller first stage orifice 168).

Now referring to FIGS. 8A and 8B, the second stage orifice 158 has a diameter D2 that is larger than the diameter D1 of the first stage orifice 168 (e.g., D2 may be approximately 0.015 inches and D1 may be approximately 0.008 inches) and, thus, the second stage orifice 158 may output flow rates that are higher than the flow rates output by the first stage orifice 168. That is, gas flowing through the outlet assembly 140 prior to actuation of the internal mechanism 166 (i.e., when the internal mechanism 166 is in position P1) may exit the outlet assembly 140 at a first flow rate and gas flowing through the outlet assembly 140 subsequent to actuation of the internal mechanism 166 (i.e., when the internal mechanism 166 is in position P2) may exit the outlet device at a second flow rate that is higher than the first flow rate. Moreover, since the diameter D2 is larger than diameter D1, gas exiting the first stage orifice 168 at a specific flow rate will not be further metered or throttled by the second stage orifice 158.

Figure 9:
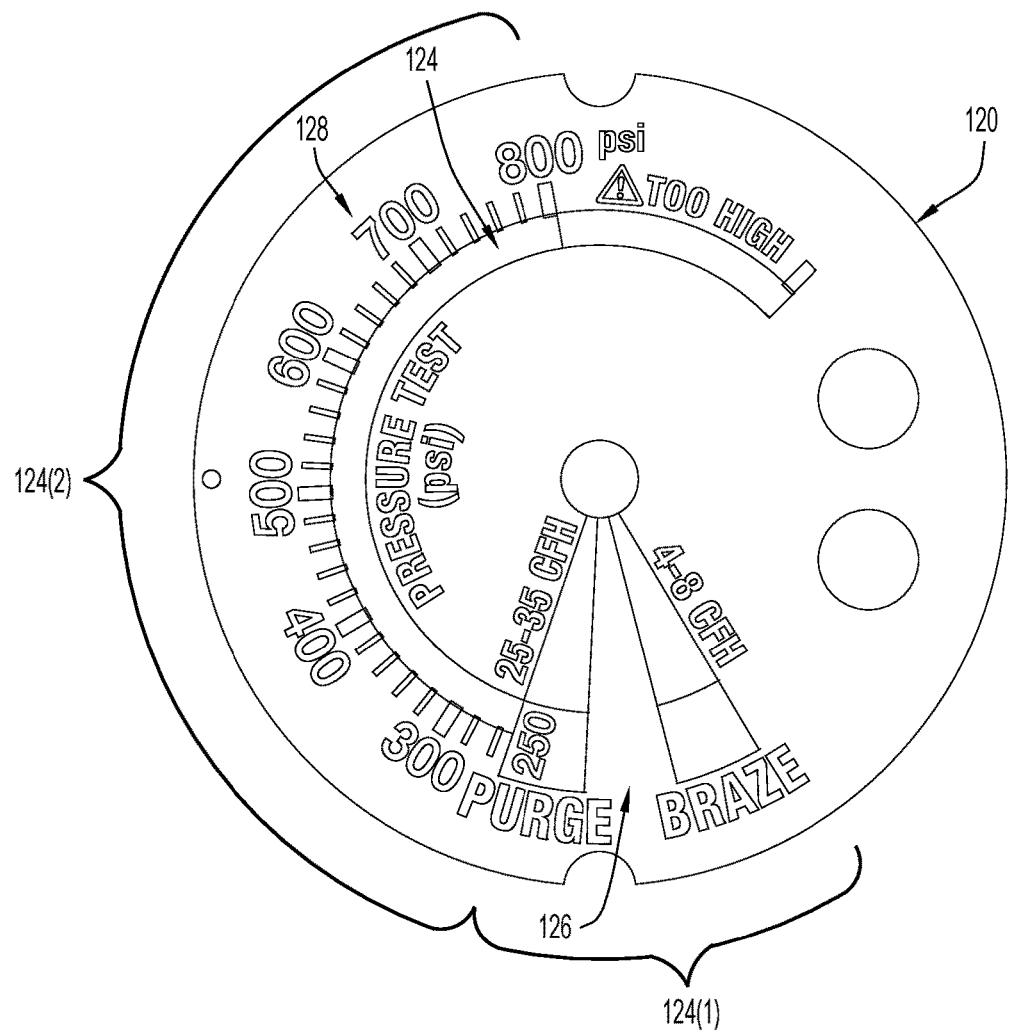
FIG. 9 is a front view of a gauge associated with the outlet device of FIG. 5.

Now turning to FIG. 9, in order to provide visual feedback of the characteristics (i.e., pressure and/or flow rate) of gas flowing through the outlet device 140, the hybrid regulator 100 includes a hybrid outlet gauge 120. The hybrid outlet gauge 120 includes first indicia 126 that provides an indication of the flow rate of gas exiting the outlet assembly 140 and second indicia 128 that provides an indication of the pressure of gas exiting the outlet assembly 140. The first indicia 126 (also referred to as flow rate indicia 126) and the second indicia 128 (also referred to as pressure indicia 128) are both included in sections of a radial area 124 extending around an outer portion of the gauge 120. In particular, the flow rate indicia 126 is included in a first portion or zone 124(1) of a radial band and the pressure indicia 128 is included in a second portion or zone 124(2) of the radial band. Consequently, an indicator needle rotatably mounted in the gauge may rotate through the flow rate indicia 126 before moving into the pressure indicia 128.

Advantageously, the aforementioned features of the hybrid flow gauge 120 allow the gauge 120 to provide an indication of flow rates at low pressures and to provide an indication of pressure when the flow rate is unlikely to be of consequence. Since, as is described above, the outlet assembly 140 automatically aligns different orifices with gas flowing through the outlet assembly 140 based on backpressure forces exerted by the gas within the outlet assembly 140, the flow rate is controlled at relatively low pressures. Typically, pressure or leak tests are not performed at these pressures and, thus, providing the flow rate indicia 126 in a first or lower zone 124(1) of the radial area 124 provides an indication of the flow rate before the pressure reaches a gauge threshold pressure (which is different from the predetermined pressure threshold that actuates the internal mechanism outlet assembly). Then, once the pressure is above the gauge threshold pressure (such as approximately 200 or 250 PSI), the gauge 120 may provide an indication of outlet gas pressure. At these pressures, the gas is flowing through the larger orifice of the outlet assembly to create a specific pressure and the flow rate is likely not of consequence.

In the particular embodiment depicted in FIG. 9, the first zone 124(1) includes a first portion that indicates that gas is exiting the outlet assembly at a flow rate suitable for purging and a second portion that indicates the gas is exiting the outlet assembly at a flow rate suitable for brazing. The zone suitable for brazing may correspond to the first stage orifice 168, insofar as the flow rate may be suitable for brazing when the gas is flowing through the first stage orifice 168 (along flow path F2). By comparison, the zone suitable for purging may correspond to the second stage orifice 158, insofar as the flow rate may be suitable for purging when the gas is flowing through the second stage orifice 158 (along flow path F3). As specific examples, the zone suitable for brazing may provide flow rates in the range of 4-8 cubic feet per hour (CFH) while the zone suitable for purging may provide flow rates in the range of 23-35CFH. In these examples, any pressure that provides a flow rate in the range of 9-22CFH (i.e., flow rates between the purging and brazing ranges) may be the pressure threshold that actuates the internal mechanism 166 of the outlet assembly 140. By comparison, a pressure of approximately 200 PSI may be the gauge threshold pressure, because this may be the point at which the gauge 120 switches from flow rate indications to pressure indications. Above the gauge threshold pressure, the gauge may provide indications that may be suitable for leak or pressure testing a system. For example, the pressure indicia 128 may comprise a pressure band with increments that allow test pressure adjustment from 250 PSI to 800 PSI.

The hybrid regulator described and presented herein (which is effectuated by the specific outlet assembly and hybrid gauge presented herein) has a number of advantages. For example, the hybrid regulator presented herein may increase the efficiency of plumbing and/or HVAC work, which frequently requires an operator to switch between applications requiring specific flow rates (i.e., purging and brazing operations) and operations requiring specific pressure (i.e., leak or pressure tests). That is, with the hybrid regulator described and presented herein, a user can seamlessly switch between pressure and flow applications because the regulator need not be removed and replaced with a different regulator. In fact, a user can even use the hybrid regulator described and presented herein when conducting pressure-specific operations over a range of pressures or flow rate-specific operations over a range of flow rates. Put simply, the hybrid regulator described and presented herein is fully versatile and fully adjustable to provide a range of pressures and a range of flow rates (i.e., the regulator can output a specific flow rate over a range of flow ranges and/or a specific pressure over a wide range of pressures).

Moreover, the hybrid regulator described and presented herein may provide a safer regulator, especially as compared to regulators that use different orifices to adjust the flow rate of gas at a predefined pressure. That is, since the hybrid regulator presented herein adjusts flow rates at low pressure, it eliminates the hazards associated with high pressure flow adjustments. In particular, since the hybrid regulator presented herein controls flow rates at pressures less than or equal to pressures for which typical low pressure industrial hoses and equipment are graded (e.g., under approximately 200 or 250 PSI), dead-ending the system is less likely to cause catastrophic hose or equipment failures. That is, if a system including low pressure hoses and the hybrid regulator presented herein dead-ends, the low pressure hoses (or other such equipment) are less likely to fail.

Still further, the hybrid gauge of the hybrid regulator described and presented herein provides visual feedback of the current pressure and/or flow rate on a single gauge face. This may provide the user with a level of confidence when performing operations that require a specific flow rate or a specific pressure and, together with the outlet assembly, may allow a user to adjust the characteristics of the gas flowing through the regulator to achieve, with certainty, a specific flow within a range of flow rates or a specific pressure within a range of pressures as needed.

To summarize, in one form, an apparatus is provided comprising: a regulator body; an inlet configured to introduce a flow of gas into the regulator body under a first pressure; and an outlet assembly that directs the flow of gas from the regulator body into a downstream gas line, the outlet assembly comprising: a first orifice of a first size; a second orifice of a second size that is larger than the first size; and a mechanism that automatically moves the first orifice between two distinct positions: a first position wherein the flow of gas passes through both the first orifice and second orifice to the downstream gas line; and a second position wherein the flow of gas bypasses the first orifice and flows through the second orifice to the downstream gas line with a specific flow rate or a second pressure that is less than the first pressure.

In another form, an outlet assembly is provided comprising: a housing defining an internal cavity; a first orifice of a first size that, in a first position is in fluid communication with a flow of gas flowing through the internal cavity; a second orifice of a second size that is larger than the first size; and an internal mechanism that automatically moves the first orifice between two distinct positions: a first position, wherein the flow of gas through the outlet assembly passes through both the first orifice and second orifice when the first orifice is in the first position so that the flow of gas exits the outlet assembly with a first flow rate; and a second position, wherein the flow of gas bypasses the first orifice and flows through the second orifice when the first orifice is in the second position so that the flow of gas exits the outlet assembly with a second flow rate.

In yet another form, a single gauge for a hybrid pressure and flowgauge regulator comprising: first indicia providing an indication of a flow rate of gas exiting an outlet of the hybrid pressure and flowgauge regulator when the gas exits with a pressure below a gauge threshold pressure; and second indicia providing an indication of a pressure of the gas exiting the outlet of the hybrid pressure and flowgauge regulator when the gas exits with a pressure above the gauge threshold pressure.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

We claim:

1. An apparatus, comprising:
    a regulator body;
    an inlet configured to introduce a flow of gas into the regulator body under a first pressure; and
    an outlet assembly that directs the flow of gas from the regulator body into a downstream gas line, the outlet assembly comprising:
        a first orifice of a first size disposed proximate both an upstream end of the outlet assembly and an upstream end of a main pathway that extends longitudinally through the outlet assembly;
        a second orifice of a second size that is larger than the first size and disposed proximate a downstream end of the outlet assembly;
        one or more auxiliary pathways that are disposed between the first orifice and the second orifice and that extend perpendicularly to the main pathway; and
        a mechanism that automatically moves the first orifice between two distinct positions:
            a first position, wherein the flow of gas passes through both the first orifice and the second orifice to the downstream gas line when the first orifice is in the first position, the flow of gas flowing through the main pathway between the first orifice and the second orifice; and
            a second position, wherein the flow of gas primarily bypasses the first orifice and flows through the one or more auxiliary pathways into the main pathway before flowing through the second orifice to the downstream gas line with a specific flow rate or a second pressure that is less than the first pressure when the first orifice is in the second position.

2. The apparatus of claim 1, wherein the regulator body further comprises:
    a gauge that provides a visual indication of both the specific flow rate and the second pressure.

3. The apparatus of claim 2, wherein the gauge comprises:
    radial indicia with a first portion and a second portion, the first portion providing an indication of the specific flow rate and the second portion providing an indication of the second pressure.

4. The apparatus of claim 3, wherein the first portion defines flow ranges for at least one of brazing and purging.

5. The apparatus of claim 1, wherein the mechanism comprises:
    a movable poppet that positions the first orifice in the first position to place the first orifice into fluid communication with the flow of gas and positions the first orifice in the second position to allow the flow of gas to primarily bypass the first orifice.

6. The apparatus of claim 5, wherein the mechanism comprises:
    a biasing member that retains the first orifice in the first position until backpressure in the outlet assembly reaches a predetermined threshold.

7. The apparatus of claim 6, wherein the backpressure automatically moves the first orifice to its second position when the backpressure reaches the predetermined threshold.

8. The apparatus of claim 1, wherein the regulator body regulates the first pressure of the flow of gas to the second pressure and further comprises:
    an adjustment assembly configured to control a magnitude of the second pressure.

9. The apparatus of claim 8, wherein the regulator body defines an internal chamber and the adjustment assembly controls the magnitude of the second pressure by adjusting a size of the internal chamber.

10. The apparatus of claim 1, wherein the first orifice defines an upstream entrance for the main pathway.

11. The apparatus of claim 1, wherein the outlet assembly further comprises:
    an annular flange that is disposed radially exteriorly of the first orifice, proximate the upstream end of the outlet assembly, the annular flange being configured to seal peripheral edges of a backpressure chamber formed around the first orifice when the first orifice is in the first position and being configured to open the peripheral edges of the backpressure chamber when the first orifice is in the second position.

12. An outlet assembly for a hybrid pressure and flowgauge regulator comprising: a housing defining an internal cavity, wherein the housing is removably securable to a regulator body of the hybrid pressure and flowgauge reglator; a first orifice of a first size that is disposed proximate both an upstream end of the internal cavity and an upstream end of a main pathway that extends longitudinally through the internal cavity; a second orifice of a second size that is larger than the first size disposed proximate a downstream end of the internal cavity; one or more auxiliary pathways that are disposed between the first orifice and the second orifice and that extend perpendicularly to the main pathway; and an internal mechanism that automatically moves the first orifice between two distinct positions: a first position, wherein a flow of gas through the outlet assembly passes through both the first orifice and the second orifice when the first orifice is in the first position so that the flow of gas exits the outlet assembly with a first flow rate, the flow of gas flowing through the main pathway between the first orifice and the second orifice; and a second position, wherein the flow of gas primarily bypasses the first orifice and flows through the one or more auxiliary pathways into the main pathway before flowing through the second orifice when the first orifice is in the second position so that the flow of gas exits the outlet assembly with a second flow rate.

13. The outlet assembly of claim 12, wherein the internal mechanism comprises:
    a movable poppet that moves the first orifice between the first position and the second position.

14. The outlet assembly of claim 13, wherein the internal mechanism comprises:

a biasing member that is biased against the movable poppet to cause the movable poppet to retain the first orifice in the first position until backpressure in the outlet assembly reaches a predetermined threshold.

15. The outlet assembly of claim 14, wherein the backpressure automatically moves the poppet so that the poppet moves the first orifice into the second position when the backpressure reaches the predetermined threshold.

16. The outlet assembly of claim 15, further comprising:
an annular passageway that is opened when the poppet moves the first orifice into the second position to allow the flow of gas to primarily bypass the first orifice, the annular passageway providing a flow path to the one or more auxiliary pathways.

17. The outlet assembly of claim 13, wherein the housing defines the second orifice and the movable poppet defines the first orifice and the main pathway.

18. The outlet assembly of claim 12, wherein the first orifice defines an upstream entrance for the main pathway.

19. The outlet assembly of claim 12, further comprising:
an annular flange that is disposed radially exteriorly of the first orifice, proximate the upstream end of the internal cavity, the annular flange being configured to seal peripheral edges of a backpressure chamber formed around the first orifice when the first orifice is in the first position and being configured to open the peripheral edges of the backpressure chamber when the first orifice is in the second position.

* * * * *